United States Patent [19]

Sayre et al.

[11] Patent Number: 5,371,112
[45] Date of Patent: Dec. 6, 1994

[54] AQUEOUS COATING COMPOSITIONS FROM POLYETHYLENE TEREPHTHALATE

[75] Inventors: Daniel R. Sayre, Lakewood, Ohio; William B. Lesney, Westchester, Ill.; Madhukar Rao, Brecksville; Richard F. Tomko, North Olmsted, both of Ohio

[73] Assignee: The Sherwin-Williams Company, Cleveland, Ohio

[21] Appl. No.: 824,424

[22] Filed: Jan. 23, 1992

[51] Int. Cl.$^5$ .................. C08J 11/04; C08G 63/00; C08L 67/02
[52] U.S. Cl. ........................ 521/48; 521/48.5; 524/603; 524/604; 524/605; 525/437; 525/445; 526/318.1; 526/318.2; 528/272; 528/308.1; 528/491
[58] Field of Search ............ 524/601, 605, 603, 604; 521/48.5, 48; 528/272, 302, 308.1; 526/318.1, 318.2, 318.6; 525/437, 445

[56] References Cited

U.S. PATENT DOCUMENTS

| | | | |
|---|---|---|---|
| 4,048,104 | 9/1977 | Svoboda et al. | 260/2.5 |
| 4,116,903 | 9/1978 | Lietz et al. | 524/381 |
| 4,228,068 | 9/1980 | Carlstrom et al. | 428/310 |
| 4,417,001 | 11/1983 | Svoboda et al. | 521/114 |
| 4,578,502 | 3/1986 | Cudmore | 528/308.1 |
| 4,977,191 | 12/1990 | Salsman | 524/601 |

FOREIGN PATENT DOCUMENTS

| | | |
|---|---|---|
| 43-23449 | 10/1968 | Japan . |
| 50-71639 | 6/1975 | Japan . |
| 0047734 | 12/1976 | Japan . |
| 0104634 | 9/1978 | Japan . |
| 0622824 | 9/1978 | U.S.S.R. . |

OTHER PUBLICATIONS

Eastman Chemicals Publication No. N-262A, *Unsaturated Polyester Resins Based on Reclaimed Polyethylene Terephthalate (PET) Beverage Bottles,* Calendine et al. (1984).

Eastman Chemicals Publication No. N-292B, *Aromatic Polyols from Reclaimed Polyethylene Terephthalate,* (1987).

*Primary Examiner*—Tae H. Yoon
*Attorney, Agent, or Firm*—Steven W. Tan; Robert E. McDonald; Heidi A. Boehlefeld

[57] ABSTRACT

Coating compositions derived from the acidolysis of polyethylene terephthalate.

17 Claims, No Drawings

AQUEOUS COATING COMPOSITIONS FROM POLYETHYLENE TEREPHTHALATE

BACKGROUND OF THE INVENTION

This invention relates to novel aqueous coating compositions which utilize polyethylene terephthalate (PET) as a raw material for producing the film-forming resin for such coatings. Most preferably, the PET is recycled or reclaimed PET from plastic articles such as two-liter beverage bottles.

Plastics such as PET account for about 7–8 weight percent, and about 20 volume percent, of the world's solid waste. As a result, much legislation has been proposed and/or adopted requiring the recycling of plastics.

PET is the primary ingredient in plastic articles such as two-liter beverage bottles and the like. In the U.S., PET is the plastic most often recycled. The biggest uses for recycled PET are as fibers in carpeting and insulation. Recycled PET is also used in bathroom equipment and blow-molded bottles.

Processes for recycling PET beverage bottles into usable raw materials for manufacturing unsaturated polyester resins are known. For example, Eastman Chemicals Publication No. N-262A entitled *Unsaturated Polyester Resins Based on Reclaimed Polyethylene Terephthalate (PET) Beverage Bottles,* Calendine et al. (1984), teaches a process for converting PET beverage bottles into useful intermediates for the synthesis of unsaturated polyesters. The unsaturated polyesters are further taught as useful as raw materials for producing unreinforced clear castings and fiberglass reinforced laminates.

A second Eastman Chemicals Publication, No. N-292B, entitled *Aromatic Polyols From Reclaimed Polyethylene Terephthalate,* (1987) teaches the reclamation of PET for production of aromatic polyester polyols which are useful in making rigid polyurethane polyisocyanurate foams.

U.S. Pat. No. 4,223,068 (Carlstrom et al.) teaches the use of the digestion product of polyalkylene terephthalate scraps with organic polyol for the production of rigid polyurethane foams.

U.S. Pat. No. 4,417,001 (Svoboda et al.) teaches the production of low smoke isocyanurate modified polyurethane foams which are prepared from polyols which are the digestion product of digesting polyalkylene terephthalate scraps and organic polyols.

U.S. Pat. No. 4,048,104 (Svoboda et al.) teaches the preparation of polyisocyanate prepolymers and polyurethane adhesives and foams wherein the prepolymers are prepared by reacting organic polyisocyanate with polyols which are the digestion product of polyalkylene terephthalate scraps and organic polyols.

SUMMARY OF THE INVENTION

This invention relates to novel aqueous coating compositions which utilize PET as a raw material for producing the film-forming resin for such coatings. Preferably, the present invention relates to aqueous coatings derived from reclaimed PET and to a process for producing such coatings. Using reclaimed PET benefits the environment by reducing the amount of solid waste dumped at landfills. Using reclaimed PET benefits this process in that it is a relatively inexpensive raw material which, as is shown herein, produces an excellent water-based coating composition.

In accordance with the present invention, PET resin (or an equivalent polyalkylene terephthalate resin), typically having a structure as shown in FIG. I:

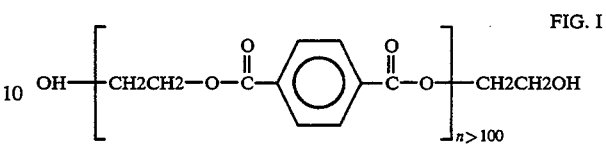

FIG. I is first digested into lower molecular weight polymeric units through an acidolysis reaction. The digestion product of the acidolysis reaction is then further reacted with a hydroxy-functional reactant to produce an exceptional resin composition for coating compositions. By varying the amounts and types of acid or hydroxy-functional reactants according to the teachings herein, one can formulate a variety of coatings systems including high acid value, water-reducible coatings and low acid value, solvent-based coatings. Additionally, further chemical modifications to either type of system are applicable and are further exemplified herein.

Accordingly, it is an object of this invention to teach the use of polyethylene terephthalate as a raw material for the production of coating compositions.

It is a further object of this invention to teach aqueous coating compositions which utilize reclaimed PET as a raw material.

These and other objects will become more readily apparent from the detailed description, examples and claims which follow below.

DETAILED DESCRIPTION OF THE INVENTION

As stated above, the present invention relates to novel aqueous coating compositions comprising PET as the starting material for the production of a film-forming resin.

1. PET SOURCE

The actual source of PET usable herein is not of critical importance to this invention. "Virgin" PET, that is PET which is commercially produced specifically as a raw material, is acceptable from a chemical standpoint for use herein. Likewise, recycled or reclaimed PET is acceptable from a chemical standpoint. At the time of this application, there are advantages to the environment (reduction of solid waste) and to the economics of this process (recycled PET is much less expensive than virgin PET) by using recycled or reclaimed PET; and, there are no performance disadvantages to using recycled PET versus virgin PET. As a consequence, recycled or reclaimed PET is a preferred starting material though it should be appreciated that any source of PET is acceptable.

Typically, the sources for PET are many and varied. One source of either virgin or recycled PET is material from PET polymer manufacturers. A second source of PET is excess PET from the operations of the beverage bottle manufacturers. A third source is private entrepreneurs dealing in reclaimed PET. A fourth source is community reclamation and recycling centers. A preferred source of PET is recycled PET beverage bottles.

For purposes of this invention, the PET should be provided in a comminuted form. It can be flaked, granulated, ground to a powder or pelletized. Preferred is flaked PET. The only constraint placed on the PET at this point is that it is relatively pure; that is, there should not be a level of impurities above about one (1) weight percent nor should there be any appreciable level of impurities which are chemically reactive within this process. PET which is acceptable for use herein should have the following characteristics:

| Intrinsic Viscosity | 0.65–0.75 |
|---|---|
| Moisture | <1.0% |
| Colored PET content | <400 ppm |
| High Density Polyethylene (HDPE) | <100 ppm |
| Adhesives | <500 ppm |
| Aluminum | <10 ppm |

2. CHEMISTRY OF PET

PET is comprised of repeating units of ethylene glycol and terephthalic acid connected by ester linkages. FIG. I, above, shows a typical PET molecule. Each repeating unit of PET has a weight average molecular weight of 192 with one equivalent of ethylene glycol and one equivalent of terephthalic acid. By reacting PET with an acid, it is possible to reduce the average chain length of the PET molecules. The chemistry of PET is such that an equilibrium exists between PET, water, ethylene glycol (EG) and terephthalic acid (TPA). This equilibrium makes it possible to substantially reverse the polymerization process and depolymerize PET into its starting materials. The Eastman Chemical publications cited above refer to the process of depolymerizing PET as "glycolysis". That process comprises the catalytic reaction of PET with a polyol. In contrast, the present invention does not use hydroxyfunctional materials, rather, the present invention uses acids and/or anhydrides to accomplish similar results.

a. Acidolysis of PET

It is possible to reverse the PET equilibrium and reduce the average chain length of PET with an acidor anhydride-functional material. The process of "acidolysis" of PET comprises the reaction of PET with an acid- or anhydride-functional material.

a.1. Acids for use in Acidolysis Reaction

Suitable acid-functional materials include mono-functional acids such as benzoic, crotonic and sorbic acids; and acids having an acid functionality on average of at least two, such as phthalic acid, succinic acid, adipic acid, azelaic acid, maleic acid, fumaric acid, trimellitic acid, trimesic acid, naphthalene dicarboxylic acids, carboxy-terminated polybutadiene, benzophenone tetracarboxylic dianhydride, 4,4'-dicaboxy diphenoxy ethane, and the hydroxy carboxylic acids of piralactone. Other suitable acids include the saturated acids such as butyric, caproic, caprylic, capric, lauric, myristic, palmitic, stearic, 12-hydroxystearic, arachidic, behenic and lignoceric acids; the unsaturated acids such as palmitoleic, oleic, ricinoleic, linoleic, linolenic, eleostearic, licaric, gadoleic and eracic acids; and the oils (and their fatty acids) such as canola, rapeseed, castor, dehydrated castor, coconut, coffee, corn, cottonseed, fish, lard, linseed, oticica, palm kernal, peanut, perilla, safflower, soya, sunflower, tallow, tung, walnut, vernonia, tall and menhaden oils; and blends and mixtures of natural and synthetic oils and fatty acids, particularly those oils and fatty acids with high iodine numbers.

a.2. Anhydrides for use in Acidolysis Reaction

Representative anhydrides include, phthalic anhydride, 3-nitrophthalic anhydride, 4-nitrophthalic anhydride, 3-flourophthalic anhydride, 4-chlorophthalic anhydride, tetrachlorophthalic anhydride, tetra bromophthalic anhydride, tetrahydrophthalic anhydride, hexahydro phthalic anhydride, methylhexahydrophthalic succinic anhydride, anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, and the like.

Other useful anhydrides include those anhydrides having a free carboxyl group in addition to the anhydride group such as trimellitic anhydride, aconitic anhydride, 2,6,7-naphthalene tricarboxylic anhydride, 1,2,4-butane tricarboxylic anhydride, 1,3,4-cyclopentane tricarboxylic anhydride, and the like.

It should be appreciated that other acids and anhydrides should be considered equivalents of those named herein.

The acid- or anhydride functional material will generally have a number average molecular weight below about 2000. Preferably the acid- or anhydride-functional material will have a number average molecular weight of below about 400. Typical number average molecular weights of these materials will range from about 96 to about 400.

Especially preferred acids and anhydrides include the vegetable fatty acids described above and trimelletic anhdyride.

Optionally, a catalyst can be used for the acidolysis reaction. If used, suitable catalysts for acidolysis of PET include the traditional transesterification catalysts including stannous octoate, calcium hydroxide, lithium hydroxide, barium hydroxide, sodium hydroxide, lithium methoxide, manganese acetate tetrahydrate, and dibutyl tin oxide (tradename Fascat, available from M&T Chemicals). Most preferred is dibutyl tin oxide. If used, the catalyst should be present in an amount of from about 0.2 weight % to about 1.5 weight % based upon the total weight of the PET and acid-functional material.

When PET and an acid- or anhydride-functional material are reacted together in the presence of the catalyst (optional) and heat, the high molecular weight PET molecule is broken down into shorter chain fragments. This is accomplished through chain attack and exchange by the acid with the terephthalic acid units of the PET molecule. This attack and exchange continues to occur until a new equilibrium is established between the PET, the shorter chain length PET, the shorter chain length PET substituted with the acid, the acid-functional material and terephthalic acid. FIG. II shows the typical products of acidolysis of PET with an acid-functional material:

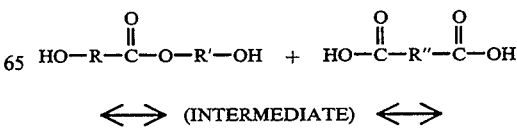

⇌ (INTERMEDIATE) ⇌

-continued

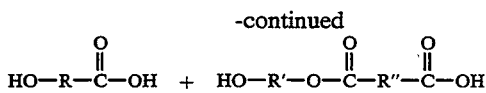

Subsequent to acidolysis, all remaining PET fragments and products in equilibrium therewith are acid-functional. As described further below, they can be reacted with hydroxy-functional materials and the like to form excellent coating compositions.

b. Further Reactions of the Acidolysis Products

As discussed briefly above, the product of the acidolysis reaction is further reacted to produce a polyester product useful in a coating composition. Since the acidolysis reaction products are acid-functional, they can be further reacted with alcohols including those taught below to obtain exceptional coatings products. By controlling the levels and amounts of reactants, as discussed below, one can formulate either high acid value or low acid value systems from the acidolysis reaction products. The products of such reactions include alkyds and polyesters which can be air or bake dried or which can be further mixed, reacted or modified to create dispersions of emulsion polymers using the alkyds or polyesters as dispersing media and acrylic modified alkyds and polyesters.

b.1. Alcohols

Typically, the alcohols will have number average molecular weights of below about 4000 and typical number average molecular weights will range from about 30 to about 4000, and especially 100 to about 400. Methods of preparing alcohols are well known in the art and the method of preparation of the alcohols is not critical to the practice of this invention.

Suitable alcohols include the C1-C22 linear and branched saturated and unsaturated alcohols including, for example, methanol, ethanol, propanol, butanol, hexanol, linoleyl alcohol, trimethylolpropane diallyl ether, allyl alcohol, 2-mercapto ethanol and the like. Additionally, useful alcohols include the hydroxy-functional polyethers, polyesters, polyurethanes, polycaprolactones, etc. as generally discussed in Sections b.1.a. through b.1.e. below.

b.1.a. Saturated and unsaturated polyols include glycerol, castor oil, ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, Bisphenol A tetraethoxylate, dodecahydro Bisphenol A, 2,2'-thio diethanol, dimethylol propionic acid, acetylenic diols, hydroxy-terminated polybutadiene, 1,4-cyclohexanedimethanol, 1,2-cyclohexanedimethanol, 1,3-cyclohexanedimethanol, 1,4-bis(2-hydroxyethoxy) cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolpropane monoallyl ether, trimethylolhexane, triethylolpropane, 1,2,4-butanetriol, glycerol, pentaerythritol, dipentaerythritol, etc.

b.1.b. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257-262, published by Interscience Publishers, Inc., 1951. Representative examples include the polypropylene ether glycols and polyethylene ether glycols such as those marketed as NIAX Polyols from Union Carbide Corporation.

b.1.c. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methyl bicyclo [2.2.1] heptene-2,3-dicarboxylic anhydride isomers) can also be used.

Representative saturated and unsaturated polyols which can be reacted in stoichiometric excess with the carboxylic acids to produce hydroxy-functional polyesters include the diols taught in b.1.a. and b.1.b., above.

Typically, the reaction between the polyols and the polycarboxylic acids is conducted at about 120° C. to about 200° C. in the presence of an esterification catalyst such as dibutyl tin oxide.

b.1.d. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON from Shell Chemical Company, and methods of preparation are representatively taught in U.S. Pat. Nos. 2,592,560; 2,582,985 and 2,694,694.

b.1.e. Other useful hydroxy-functional polymers can be prepared by the reaction of an excess of at least one alcohol, such as those representatively described above, with isocyanates to produce hydroxy-functional urethanes. Representative monofunctional isocyanates include allyl isocyanate and tolulyl isocyanate. Representative polyisocyanates include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanato methyl-3,5,5-trimethyl cyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, 4,4'-toluidine, and 1,4-xylylene diisocyanates; benzene 1,3-bis (1-isocyanato-1-methyl ethyl); the nuclear substituted aromatic compounds such as dianisidine diisocyanate, 4,4'-diphenylether diisocyanate and chlorodiphenylene diisocyanate; the triisocyanates such as triphenyl methane-4,4', 4''-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, and/or allophanate linkages. The isocyanates and the alcohols are typically reacted at temperatures of 25° C. to about 150° C. to form the hydroxy-functional polymers.

Especially preferred hydroxy-functional materials in the practice of this invention are mono-functional alcohols such as trimethylolpropane diallyl ether and allyl alcohol; and diols and triols such as ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy) cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolpropane monoallyl ether, trimethylolhexane, triethylolpropane, 1,2,4-butanetriol, glycerol, pentaerythritol, dipentaerythritol; and mixtures thereof.

Most preferred are trimethylolpropane diallyl ether, propylene glycol, ethylene glycol, diethylene glycol, and mixtures thereof. It should be appreciated that other alcohols should be considered equivalents of those named herein.

c. High and Low Acid Value Products using the Acidolysis Reaction Products

As stated above, the acidolysis reaction products can are further reacted with alcohol to produce either high or low acid value products. For purposes of the present invention, the term "high acid value" is meant to be those compositions having acid values greater than about 30. The term "low acid value" is meant to be those compositions having acid values lower than about 20. Compositions having acid values between about 20 and about 30 tend to exhibit characteristics of both high and low acid value products and, thus, are not categorized as either high acid value or low acid value, although it should be appreciated that with some trial and error such compositions may be acceptable in either category.

As a guideline, in order to formulate an acidolysis reaction product to a high acid value of between about 55 and about 65, the following stoichiometric proportions (in moles of equivalents) of materials should be used. For each mole of PET used, from about 1.0 to about 1.5 moles of acid/anhydride should be used in the acidolysis reaction, followed by further reaction with about 0.05 to about 0.2 moles of OH. Preferably, the moles of acid to PET should be about 1.0:1 to about 1.1.2:1 and the moles of OH to PET should be about 0.05:1 to about 0.1:1 for such higher acid value products.

In order to formulate an acidolysis reaction product to a low if acid value of less than about 20, the following stoichiometric proportions (in moles of equivalents) of materials should be used. For each mole of PET used, from about 1.0 to about 1.5 moles of acid/anhydride should be used in the acidolysis reaction, followed by further reaction with about 0.1 to about 0.3 moles of OH. Preferably, the moles of acid to PET should be about 1:1 to about 1.2:1 and the moles of OH to PET should be about 0.15:1 to about 0.25:1.

d. Final Coating Products

The products of Section 2.c. can be used by themselves, in combination with other well known coatings additives, including pigments, flow agents, catalysts, diluents, solvents, ultraviolet light absorbers, and the like, or can be further mixed, reacted or modified as described below.

The high acid value products (that is, acid values greater than about 30) of Section 2.c., or such products in combination with the above-described additives, can be dispersed or reduced in water once neutralized with a weak base solution such as a tertiary amine in water. Neutralization techniques are well known in the coatings art. In a preferred embodiment, the high acid value products of Section 2.c. can be reduced in water and thereafter serve as the stabilizing media for the emulsion polymerization of acrylic and other ethylenically unsaturated monomers, including acrylic addition monomers, oligomers and polymers; particularly one or more alkyl esters of acrylic acid or methacrylic acid; optionally together with one or more other ethylenically unsaturated monomers.

Suitable acrylic esters include methyl (meth)acrylate, ethyl (meth)acrylate, propyl (meth)acrylate, butyl (meth)acrylate, hydroxy ethyl (meth)acrylate, 2-ethyl hexyl (meth)acrylate, acrylonitrile, acrylamide, vinyl polymers such as polymers of vinyl esters of inorganic or organic acids, including vinyl chloride, vinyl acetate, vinyl propionate, vinyl toluene, etc., styrene, and mixtures thereof.

Emulsion polymerization reaction conditions are well known in the art and can include the procedures taught in U.S. Pat. No. 4,116,903, incorporated herein by reference as well as the procedures taught in the Examples below.

The low acid value products (that is, acid values less than about 20) of such section, or such products in combination with the above-described additives, can be reduced in solvents such as xylene, toluene, benzene, mineral spirits and the like. Such products can then be allowed to air dry or forced to dry by baking as is well known in the art. A melamine, or equivalent, agent would preferably be added to facilitate drying in the bake dry systems. In a preferred embodiment, the low acid value products of Section 2.c. can be directly modified with acrylic monomers, oligomers and polymers to produce air dry, bake and water-reducible coatings.

Suitable acrylic monomers, oligomers and polymers include those acrylic, vinylic and ethylenically unsaturated materials taught to be useful with the high acid value products as well as the acrylic acids themselves such as acrylic acid, methacrylic acid and itaconic acid.

In another preferred embodiment, either the high or the low acid value products of Section 2.c. can be further modified by direct acrylic modification. Direct acrylic modification is typically conducted under conditions also well known in the art, including the procedures taught in U.S. Pat. Nos. 4,735,995 and 4,873,281, incorporated herein by reference, as well as by the procedures taught in the Examples below.

When acrylically modifying the low acid value products, the incorporation of a high level of acid-functional acrylic materials will enable the final, acrylic-modified coating product to be reducible in water or other aqueous systems. Generally, amounts of acid-functional acrylic materials greater than about 1.0% by weight of the total amount of acrylic and other ethylenically unsaturated materials will result in a coating composition which is water reducible. Amounts less than the above will generally result in coatings which are not water reducible.

The coatings of this invention may typically be applied to any substrate such as metal, plastic, wood, and glass, by brushing, dipping, roll coating, flow coating, spraying or other method conventionally employed in the coating industry.

Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The following examples have been selected to illustrate specific embodiments and practices of advantage to a more complete understanding of the invention. Unless otherwise stated, "parts" means parts-by-weight and "percent" is percent-by-weight.

EXAMPLE I: ACIDOLYSIS OF PET

A high acid value, water reducible resin was prepared according to the following procedure:

A 31, 4-necked round bottom flask equipped with inert gas, mechanical stirrer, Barrett tube and Friedrich's condenser was charged with 606.64 g of polyethylene terephthalate, 887.6 g of high content linoleic fatty acid (Prifac 8960), 3.3 g of dibutyl tin oxide catalyst and 55 g xylene. The contents were heated to 490° F. and held until all contents had melted and a clear solution was obtained. The solution was cooled to 325F and 70.65 g of trimethylolethane was added. The contents were heated to 465° F. and held for an acid value of between 30–35. Once reached, heat was removed and the contents allowed to cool. The final resin product had an NVM of 98.8, acid value of 31, Mz of 4424, Mw of 2367, Mn of 1389 and Pd of 1.70.

EXAMPLE II: ACIDOLYSIS OF PET

A low acid value resin was prepared according to the following procedure:

A 31, 4-necked round bottom flask equipped with inert gas, mechanical stirrer, Barrett tube and Friedrich's condenser was charged with 608.64 g of polyethylene terephthalate, 887.6 g of high content linoleic fatty acid (Prifac 8960), 3.3 g of dibutyl tin oxide catalyst and 55 g xylene. The contents were heated to 490° F. and held until all contents had melted and a clear solution was obtained. The solution was cooled to 325° F. and 240 g of trimethylolethane was added. The contents were heated to 460° F. and held for an acid value of less than 12. Once reached, heat was removed and the contents allowed to cool. The final resin product had an NVM of 97.9, viscosity of 12,200 cps (using Brookfield LVT#3, 12 rpm), acid value of 3.8, Mz of 8019, Mw of 3619, Mn of 1639 and Pd of 2.20.

EXAMPLE III: ACIDOLYSIS OF PET

A low acid value resin was prepared according to the following procedure:

A 31, 4-necked round bottom flask equipped with inert gas, mechanical stirrer, Barrett tube and Friedrich's condenser was charged with 764.72 g of polyethylene terephthalate, 1124.42 g of tall oil fatty acid, 9.5 g of dibutyl tin oxide catalyst and 55 g xylene. The contents were heated to 490° F. and held until all contents had melted and a clear solution was obtained. The solution was cooled to 325° F. and 301.62 g of trimethylolethane was added. The contents were heated to 465° F. and held for an acid value of less than 10. Once reached, heat was removed and the contents allowed to cool. The final resin product had an NVM of 98.3, viscosity of 11,200 cps (using Brookfield LVT#3, 12 rpm), acid value of 6.6, Mz of 4464, Mw of 2522, Mn of 1418 and Pd of 1.78.

EXAMPLE IV: ACRYLIC EMULSION POLYMERIZATION 795.6 g of a resin prepared according to the procedure of Example I and 70 g of deionized water were charged to a reaction vessel and heated to about 80C. Added to the vessel over a 3.5 hour period was 76.2 g of methyl methacrylate and 41 g of butyl acrylate. A second feed of 1.5 g of ammonium persulfate in 200 g water was added over the same time period. Upon complete addition of both feeds, the reaction was killed with 0.5 g sodium metabisulfite in 5 g water. A chase of 1.0 g ammonium persulfite in 50 g water was added over a 1.5 hour time period. This reaction was also killed with 0.5 g sodium metabisulfite in 5 g water. Heat was removed and the contents of the vessel filtered. The resultant composition had a pH of 8.17, an NVM of 27.9% and a viscosity of 1700 cps (Brookfield LVT#3, 12rpm). Free methyl methacrylate content was 1.23%.

EXAMPLE V: DIRECT ACRYLIC MODIFICATION 511 g of the resin of Example II and 250 g of Propasol (propylene glycol monobutyl ether) were charged to a reaction vessel and heated to about 140° C. Added to the vessel over a 3.5 hour period was 304.0 g of methyl methacrylate, 50 g of methacrylic acid, 100.0 g of hydroxy ethyl acrylate, and 46 g of ethyl hexyl acrylate. A second feed of 12.5 g of t-butyl perbenzoate (2.5% in Propasol) was added over the same time period. Upon complete addition of both feeds, a chase of 2.3 g t-butyl perbenzoate in 30 g of Propasol was added over a 1.5 hour time period. Heat was removed and the contents of the vessel filtered.

EXAMPLE VI: DISPERSION IN WATER

The composition of Example V was added to 1000 g of water and 50 g of triethylamine. It had an NVM of 35.5%, a pH of 8.05 and a viscosity of 2150 cps (Brookfield LVT#3, 12 rpm).

EXAMPLE VII: BAKE DRY ENAMEL FORMULA

A resin prepared according to the procedure of Example I can be formulated to a bake dry coating having PVC 18.0, NVM 50.1, weight per gallon 10.05 lbs/gal and VOC of 1.95 lbs/gal as follows:

In a high speed disperser, grind the following:

|          | 191.3 g       | Resin of Example I                |
|----------|---------------|-----------------------------------|
|          | 40.7          | Propasol P                        |
|          | 5.9           | Dimethylethanolamine              |
| Add      | 228.5         | Rutile titanium dioxide           |
|          | 32.9          | Water                             |
| Run to 7H| (Hegman Grind)|                                   |
| Stabilize| 135.5         | Water                             |
| Thindown | 100.6         | Resin of Example I                |
|          | 36.3          | Propasol P                        |
|          | 82.7          | Melamine                          |
|          | 5.4           | Dimethylethanolamine              |
|          | 12.8          | 2-butoxy ethanol (Butyl Cellosolve)|
|          | 232.2         | Water                             |

What is claimed is:

1. An aqueous coating composition comprising:
   a. the reaction product of polyethylene terephthalate with a member of the group consisting of acid- and anhydride-functional materials;
   b. followed by the reaction of the product of step "a" with an alcohol; wherein the resultant composition has an acid value greater than about 30; and wherein subsequent to the reaction of step "b" the resultant composition is neutralized with a weak base and added to water.

2. The coating composition of claim 1 wherein the alcohol is selected from the group consisting of monofunctional alcohols, diols and triols having number average molecular weights of below about 4000.

3. The coating composition of claim 2 wherein the alcohol is selected from the group consisting of:
   a) C1-C22 linear and branched saturated and unsaturated alcohols and mixtures thereof,
   b) saturated and unsaturated polyols and mixtures thereof;
   c) Polyether polyols prepared by the reaction of a diol or polyol with an alkylene oxide;
   d) polyesters prepared by the condensation of polyhydric alcohols and polycarboxylic acids or anhydrides, with or without the inclusion of drying oil, semi-drying oil, or non-drying oil fatty acids while maintaining an excess of hydroxyl groups;
   e) hydroxy-functional polymers prepared by the ring opening reaction of epoxides and/or polyepoxides with primary, secondary amines or polyamines;
   f) hydroxy-functional urethane polymers prepared by the reaction of an excess of at least one alcohol with isocyanates.

4. The coating composition of claim 2 wherein for each mole of polyethylene terephthalate, from about 0.05 to about 0.2 moles of hydroxy functionality and from about 1.0 to about 1.5 moles of acid/anhydride functionality are present.

5. The coating composition of claim 3 wherein the alcohol is selected from the group consisting of trimethylolpropane diallyl ether, allyl alcohol; ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, trimethylolethane, trimethylolpropane, trimethylolpropane monoallyl ether, trimethylolhexane, triethylolpropane, 1,2,4-butanetriol, glycerol, pentaerythritol, dipentaerythritol; and mixtures thereof.

6. The coating composition of claim 5 wherein the alcohol is selected from the group consisting trimethylolpropane diallyl ether, propylene glycol, ethylene glycol, diethylene glycol, and mixtures thereof.

7. The coating composition of claim 1 wherein the acid- and anhydride-functional materials are selected from the group consisting of benzoic, crotonic and sorbic acids; phthalic acid, succinic acid, adipic acid, azelaic acid, maleic acid, fumaric acid, trimellitic acid, trimesic acid, naphthalene dicarboxylic acids, carboxy-terminated polybutadiene, benzophenone tetracarboxylic dianhydride, 4,4'-dicaboxy diphenoxy ethane, hydroxy carboxylic acids of piralactone; butyric, caproic, caprylic, capric, lauric, myristic, palmitic, stearic, 12-hydroxystearic, arachidic, behenic and lignoceric acids; palmitoleic, oleic, ricinoleic, linoleic, linolenic, eleostearic, licaric, gadoleic and eracic acids; canola, rapeseed, castor, dehydrated castor, coconut, coffee, corn, cottonseed, fish, lard, linseed, oticica, palm kernal, peanut, perilla, safflower, soya, sunflower, tallow, tung, walnut, vernonia, tall and menhaden oils and fatty acids thereof; blends and mixtures of natural and synthetic oils and fatty acids phthalic anhydride, 3-nitrophthalic anhydride, 4-nitrophthalic anhydride, 3-flourophthalic anhydride, 4-chlorophthalic anhydride, tetrachlorophthalic anhydride, tetra bromophthalic anhydride, tetrahydrophthalic anhydride, hexahydro phthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane-1,2-dicarboxylic anhydxide, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride; trimellitic anhydride, aconitic anhydride, 2,6,7-naphthalene tricarboxylic anhydride, 1,2,4-butane tricarboxylic anhydride, 1,3,4-cyclopentane tricarboxylic anhydride; and mixtures thereof.

8. The coating composition of claim 7 wherein the acid- and anhydride-functional materials are selected from the group consisting of the vegetable fatty acids of claim 7 and trimellitic anhydride.

9. A coating composition comprising:
   a. the reaction product of polyethylene terephthalate with a member of the group consisting of acid- and anhydride-functional materials;
   b. wherein the composition of step "a" is further reacted with an alcohol to produce a composition having an acid value greater than about 30;
   c. wherein the composition of step "b" is neutralized with a weak base and added to water;

d. and, wherein acrylic and other ethylenically unsaturated monomers are subsequently polymerized in the presence of the composition of step "c".

10. The coating composition of claim 9 wherein the alcohol is selected from the group consisting of monofunctional alcohols, diols and triols having number average molecular weights of below about 4000.

11. The coating composition of claim 10 wherein the alcohol is selected from the group consisting of:
   a) C1-C22 linear and branched saturated and unsaturated alcohols and mixtures thereof,
   b) saturated and unsaturated polyols, and mixtures thereof;
   c) Polyether polyols prepared by the reaction of a diol or polyol with an alkylene oxide;
   d) polyesters prepared by the condensation of polyhydric alcohols and polycarboxylic acids or anhydrides, with or without the inclusion of drying oil, semi-drying oil, or non-drying oil fatty acids while maintaining an excess of hydroxyl groups;
   e) hydroxy-functional polymers prepared by the ring opening reaction of epoxides and/or polyepoxides with primary, secondary mines or polyamines;
   f) hydroxy-functional urethane polymers prepared by the reaction of an excess of at least one alcohol with isocyanates.

12. The coating composition of claim 11 wherein for each mole of polyethylene terephthalate, from about 0.05 to about 0.2 moles of hydroxy functionality and from about 1.0 to about 1.5 moles of acid/anhydride functionality are present.

13. The coating composition of claim 12 wherein the alcohol is selected from the group consisting of trimethylolpropane diallyl ether, allyl alcohol; ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetra methylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane-1,3-diol, 2-butene-1,4-diol, and polyols such as trimethylolethane, trimethylolpropane, trimethylolpropane monoallyl ether, trimethylolhexane, triethylolpropane, 1,2,4-butanetriol, glycerol, pentaerythritol, dipentaerythritol; and mixtures thereof.

14. The coating composition of claim 13 wherein the alcohol is selected from the group consisting trimethylolpropane diallyl ether, propylene glycol, ethylene glycol, diethylene glycol, and mixtures thereof.

15. The coating composition of claim 9 wherein the acid- and anhydride-functional materials are selected from the group consisting of benzoic, crotonic and sorbic acids; phthalic acid, succinic acid, adipic acid, azelaic acid, maleic acid, fumaric acid, trimellitic acid, trimesic acid, naphthalene dicarboxylic acids, carboxy-terminated polybutadiene, benzophenone tetracarboxylic dianhydride, 4,4'-dicaboxy diphenoxy ethane, hydroxy carboxylic acids of piralactone; butyric, caproic, caprylic, capric, lauric, myristic, palmitic, stearic, 12-hydroxystearic, arachidic, behenic and lignoceric acids; palmitoleic, oleic, ricinoleic, linoleic, linolenic, eleostearic, licaric, gadoleic and eracic acids; canola, rapeseed, castor, dehydrated castor, coconut, coffee, corn, cottonseed, fish, lard, linseed, oticica, palm kernal, peanut, perilla, safflower, soya, sunflower, tallow, rung, walnut, vernonia, tall and menhaden oils and fatty acids thereof; blends and mixtures of natural and synthetic oils and fatty acids phthalic anhydride, 3-nitrophthalic anhydride, 4-nitrophthalic anhydride, 3-flourophthalic anhydride, 4-chlorophthalic anhydride, tetrachlorophthalic anhydride, tetra bromophthalic anhydride, tetrahydrophthalic anhydride, hexahydro phthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane-1,2-dicarboxylic anhydride, 4-cyclohexene-1,2-dicarboxylic anhydride, 4-methyl-4-cyclohexene-1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride; trimellitic anhydride, aconitic anhydride, 2,6,7-naphthalene tricarboxylic anhydride, 1,2,4-butane tricarboxylic anhydride, 1,3,4-cyclopentane tricarboxylic anhydride; and mixtures thereof.

16. The coating composition of claim 15 wherein the acid- and anhydride-functional materials are selected from the group consisting of the vegetable fatty acids of claim 15 and trimellitic anhydride.

17. The coating composition of claim 9 wherein the acrylic and other ethylenically unsaturated monomers are selected from the group consisting of methyl (meth)acrylate, ethyl (meth)acrylate, propyl (meth)acrylate, butyl (meth)acrylate, hydroxy ethyl (meth)acrylate, and 2-ethyl hexyl (meth)acrylate; acrylonitrile; acrylamide; vinyl chloride, vinyl acetate, vinyl propionate, vinyl toluene; styrene; acrylic acid, methacrylic acid and itaconic acid; and mixtures thereof.

* * * * *